United States Patent

Scansani

Patent Number: 5,900,049
Date of Patent: * May 4, 1999

[54] MODELING MASS FOR CHILDREN AND ADULTS AND METHOD OF PRODUCING THE SAME

[76] Inventor: Antonio Scansani, Rua Sebastiao Afonso, #22, Araras/Sao Paulo, Brazil

[ * ] Notice: This patent issued on a continued prosecution application filed under 37 CFR 1.53(d), and is subject to the twenty year patent term provisions of 35 U.S.C. 154(a)(2).

[21] Appl. No.: 08/970,649

[22] Filed: Nov. 14, 1997

[30] Foreign Application Priority Data

Nov. 14, 1996 [BR] Brazil ...................................... 9604545

[51] Int. Cl.$^6$ ................................................. C09D 105/00
[52] U.S. Cl. .......................................................... 106/162.8
[58] Field of Search ........................... 106/162.8, 205.31, 106/205.72

[56] References Cited

U.S. PATENT DOCUMENTS 4,618,491  10/1986  Kanematu et al. ........................ 424/81
4,735,660  4/1988  Cane ........................................ 106/203
5,308,546  5/1994  Hansen et al. ...................... 252/301.36

FOREIGN PATENT DOCUMENTS 8600871  2/1986  Brazil .

*Primary Examiner*—David Brunsman
*Attorney, Agent, or Firm*—Michael J. Striker

[57] ABSTRACT

A modeling mass for children and adults has a mixture composed of the following components in weight %:

| | |
|---|---|
| Guar Gum | 2.7–3.3 |
| Redestillate Glycerin | 2.0–2.8 |
| CarboxyMethyl Cellulose | 0.6–0.8 |
| Neutral Alcohol 96° GL | 4.0–6.0 |
| Borax | 0.65–0.75 |
| Methyl paraben | 0.14–0.30 |
| Propyl Paraben | 0.04–0.10 |
| Benzoate of Sodium | 0.10–0.30 |
| Deminieralized water | 85.0–89.0 |
| Coloring, Natural Nutritious | 0.04–0.10. |

4 Claims, No Drawings

MODELING MASS FOR CHILDREN AND ADULTS AND METHOD OF PRODUCING THE SAME

BACKGROUND OF THE INVENTION

The present invention relates to a modeling mass for children and adults, in particular for entertainment for any age group, in particular for preferable use for children of little age, and also to a method of producing the same.

It is well known that the children of little age, generally above five years, possess great interest in toys or pastimes for setting up, dismounting, modifying and creating shapes in accordance with their own imagination. Among those toys accepted in the market are modeling masses for traditional modeling which are well known in the art. According to the specialists in infantile education, the utilization of the modeling mass develops the motor coordination of the children, besides exposing their creativity and imagination for entertaining artistic development, and also provides a perfect educational recreation.

In spite of the great acceptance of the traditional modeling masses, preferably for children, as well as for educators and pedagogues, the existing modeling masses have some disadvantages which cause inconveniences of their use, restrict or even suppress their use in detriment to the children's creative development. Among the disadvantages of the existing modeling masses, there is a relative lack of malleability of the traditional masses that possess an inadequate rigidity to a force of the children, the known modeling masses are fast drying, a total waste of the existing modeling masses therefore is possible. Another negative factor in the use of the conventional modeling masses is their excessive oiliness that causes stains on the clothes and on the childrens skin as well as an unpleasant scent of the masses. The main point of rejection in the acquisition of the modeling masses for parents or people responsible for the children is the fact that the conventional masses detach small portions or pieces that end dropping on the ground, come to get entangled between carpet fibers, rugs, curtains, etc. and are almost impossible to be totally removed.

One proposal for dealing with these problems is disclosed for example in the Brazilian patent application no. Pl-8600871-04. However the modeling mass proposed in this reference still has a serious disadvantages due to its inadequate formation, since it still liberates small portions or pieces that stick to the fabrics and fibers with great easiness.

SUMMARY OF THE INVENTION

Accordingly, it is an object of present invention to provide a modeling mass which avoids the disadvantages of the prior art.

In keeping with these objects and with others which will become apparent hereinafter, one feature of present invention resides, briefly stated, in a modeling mass for children and adults which is a mixture of the following components, in weight %".

| | |
|---|---|
| Guar Gum | 2.7 TO 3.3% |
| Redestillate Glycerin | 2.0 TO 2.8% |
| Lanolin | 0.6 TO 0.8% |
| Carboxy Methyl Cellulose | 0.6 TO 1.0% |
| Neutral Alcohol 96° GL | 4.0 TO 6.0% |
| Borax | 0.65 TO 0.75% |
| Methyl Paraben | 0.14 TO 0.30% |

-continued

| | |
|---|---|
| Propyl Paraben | 0.04 TO 0.10% |
| Benzoate of Sodium | 0.10 TO 0.30% |
| Demineralized Water | 85.0 TO 89.0% |
| Coloring, Natural Nutritious | 0.04 TO 0.10% |

When the modeling mass is formed in accordance with the present invention, it carries out its function with efficiency and versatility without above mentioned inconveniences and disadvantages.

The modeling mass is a gelatinous mass of high viscosity or simply gel that can be colored, and can stay translucent or not translucent.

Due to its basic composition or its process of preparation, the obtained gel is easy to manipulate, it can stay for long periods out of its packing without drying up, it does not posses oiliness, it does not promote stains of any type, it is scentless and innocuous in all aspects, and it does not facilitates detachment of small pieces due to its high viscosity.

The novel features which are considered as characteristic for the present invention are set forth in particular in the appended claims. The invention itself, however, both as to its construction and its method of operation, together with additional objects and advantages thereof, will be best understood from the following description of specific embodiments.

DESCRIPTION OF PREFERRED EMBODIMENTS

In accordance with present invention a modeling mass for children and adults is proposed. The modeling mass is a mixture of the following components in weight %:

| | |
|---|---|
| guar gum | 2.7 TO 3.3% |
| redestillate glycerin | 2.0 TO 2.8% |
| lanolin | 0.6 TO 0.8% |
| carboxy methyl cellulose | 0.6 TO 1.0% |
| neutral alcohol 96° GL | 4.0 TO 6.0% |
| borax | 0.65 TO 0.75% |
| methyl paraben | 0.14 TO 0.30% |
| propyl paraben | 0.04 TO 0.10% |
| benzoate of sodium | 0.10 TO 0.30% |
| demineralized water | 85.0 TO 89.0% |
| coloring, natural nutritious | 0.04 TO 0.10% |

In accordance with a preferable embodiment of the present invention, the modeling mass for childrens and adults in accordance with present invention is a mixture of the above mentioned components with the following weight %.

| | |
|---|---|
| GUAR GUM | 3.0% |
| REDESTILLATE GLYCERIN | 2.4% |
| LANOLIN | 0.7% |
| CARBOXY METHYL CELLULOSE | 0.8% |
| NEUTRAL ALCOHOL 96° GL | 5.0% |
| BORAX | 0.7% |
| METHYL PARABEN | 0.15% |
| PROPYL PARABEN | 0.05% |
| BENZOATE OF SODIUM | 0.15% |
| DEMINERALIZED WATER | 87.0% |
| COLORING, NATURAL NUTRITIOUS | 0.05% |

In order to produce the modeling mass in accordance with the present invention a batch process is utilized with the use of a plurality of receptacles for weighing the components for example 11 receptacles, one electronic scale, and one homogenization tank.

The modeling mass is obtained in accordance with an exemplary process which is described hereinbelow. Each of the above mentioned components is weighed in the weighing receptacles. 4–6 liters of water, preferably 5 liters of water, are heated to a temperature of 35°–45° C., preferably 40° C. The components including Methyl Paraben, Propyl Paraben, Borax and Benzoate of Sodium are dissolved in the heated water to form a solution. The components weighed are introduced in the homogenization tank in the following order:

Demineralized water, Glycerin, Alcohol, Carboxy Methyl Cellulose, Coloring, Natural, and the Solution of Methyl Paraben, Propyl Paraben, Borax and Benzoate of Sodium. The whole mixture is homogenized in the homogenization tank for approximately 5 minutes. Then the Guar Gum and the Lanolin are introduced. Then the total mixture is homogenized for more than 5 minutes to obtain a uniformity.

The thusly obtained modeling mass is a gel for entertainment and fun which is easy to prepare and has a high viscosity.

It will be understood that each of the elements described above, or two or more together, may also find a useful application in other types of constructions differing from the types described above.

While the invention has been illustrated and described as embodied in modeling mass for children and adults and method of producing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A modeling mass for children and adults, comprising a mixture composed of the following components in weight percent:

| | |
|---|---|
| Guar Gum | 2.7–3.3 |
| Redestillate Glycerin | 2.0–2.8 |
| CarboxyMethyl Cellulose | 0.6–0.8 |
| Neutral Alcohol 96° GL | 4.0–6.0 |
| Borax | 0.65–0.75 |
| Methyl paraben | 0.14–0.30 |
| Propyl Paraben | 0.04–0.10 |
| Benzoate of Sodium | 0.10–0.30 |
| Deminieralized water | 85.0–89.0 |
| Coloring, Natural Nutritious | 0.04–0.10. |

2. A modeling mass as defined in claim 1, wherein said mixture contains the following components in weight %:

Guar Gum 3

Redestillate Glycerin 2.4

Neutral Alcohol 96% GL 5

Benzoate of Sodium 0.15

Demineralized water 87.0

Coloring, Natural Nutritious 0.05.

3. A method for producing a modeling mass for children and adults, comprising the step of preparation a mixture composed of the following components in weight %:

| | |
|---|---|
| Guar Gum | 2.7–3.3 |
| Redestillate Glycerin | 2.0–2.8 |
| Carboxy Methyl Cellulose | 0.6–0.8 |
| Neutral Alcohol 96° GL | 4.0–6.0 |
| Borax | 0.65–0.75 |
| Methyl Paraben | 0.14–0.30 |
| Propyl Paraben | 0.04–0.10 |
| Benzoate of Sodium | 0.10–0.30 |
| Demineralized water | 85.0–89.0 |
| Coloring, Natural Nutritious | 0.04–0.10. |

4. A method as defined in claim 3, wherein said step of preparation including weighing each of the components separately in weighing receptacles, heating 4–6 liters of water to a temperature 35°–45° C., dissolving Methyl Paraben, Propyl Paraben, Borax and Benzoate of Sodium in the water to form a solution, adding in a homogenization tank in a following order Demineralized Water, Glycerin, Alcohol, Carboxy Methyl Cellulose, Natural Coloring and the solution of Methyl Paraben, Propyl Paraben, Borax and Benzoate of Sodium to obtain a mixture, homogenizing the mixture for approximately 5 minutes, adding to the mixture Guar Gum and Lanolin to obtain a total mixture, and homogenizing the total mixture for approximately 5 minutes to a desired uniformity.

* * * * *